US011654502B2

(12) United States Patent
Solis, Jr.

(10) Patent No.: US 11,654,502 B2
(45) Date of Patent: May 23, 2023

(54) METHOD OF ROTATING A WELDING TORCH DURING OPERATION

(71) Applicant: American Torch Tip Company, Bradenton, FL (US)

(72) Inventor: Juan Reynaldo Solis, Jr., Bradenton, FL (US)

( * ) Notice: Subject to any disclaimer, the term of this patent is extended or adjusted under 35 U.S.C. 154(b) by 155 days.

(21) Appl. No.: 16/985,438

(22) Filed: Aug. 5, 2020

(65) Prior Publication Data

US 2020/0361017 A1 Nov. 19, 2020

Related U.S. Application Data

(63) Continuation-in-part of application No. 15/813,932, filed on Nov. 15, 2017, now Pat. No. 10,766,093.

(51) Int. Cl.
*B23K 9/133* (2006.01)
*B23K 9/32* (2006.01)
*B23K 9/29* (2006.01)
*B23K 9/173* (2006.01)

(52) U.S. Cl.
CPC ............. *B23K 9/1336* (2013.01); *B23K 9/32* (2013.01); *B23K 9/173* (2013.01); *B23K 9/295* (2013.01)

(58) Field of Classification Search
CPC ...... B23K 9/1336; B23K 9/173; B23K 9/287; B23K 9/295; B23K 9/32; B23K 9/323; H01R 35/04
USPC .................................................. 219/137.63
See application file for complete search history.

(56) References Cited

U.S. PATENT DOCUMENTS

| | | | |
|---|---|---|---|
| 7,665,996 B2 | 2/2010 | Jaeger | |
| 8,993,928 B2 * | 3/2015 | Laymon | B23K 9/293 219/137.31 |
| 2007/0000894 A1 | 1/2007 | Klein | |
| 2010/0012637 A1 | 1/2010 | Jaeger | |
| 2013/0186874 A1 | 7/2013 | Ihde | |
| 2014/0131336 A1 * | 5/2014 | Jacques | B23K 9/323 219/137.63 |

(Continued)

FOREIGN PATENT DOCUMENTS

WO WO 2005/049259 A1 6/2005
WO WO 2005/118232 A1 12/2005

OTHER PUBLICATIONS

Dinse Revo Torch Brochure. pp. 1-6. Dinse G.m.b.H. Hamburg, Germany.

(Continued)

*Primary Examiner* — Dana Ross
*Assistant Examiner* — James F Sims, III
(74) *Attorney, Agent, or Firm* — Accel IP Law, PLLC; Ferdinand (Fred) M. Romano

(57) ABSTRACT

A method of operating a welding torch using a rotating coupler assembly that operates between 0 and 800 amps. The rotating coupler assembly allows for 360 degrees of rotation while keeping rotational friction at a minimum. The breakaway torque for the rotating coupler assembly is insignificant and the rotating coupler assembly can be rotated with little effort by hand. While the rotating coupler assembly minimizes rotational friction the design allow for rotating coupler assembly to continue to operate after 1-5 mm of wear on the contact surfaces. An embodiment of the rotating coupler assembly can be quickly disconnected from the unicable.

17 Claims, 6 Drawing Sheets

(56) References Cited

U.S. PATENT DOCUMENTS

2015/0069039 A1    3/2015  Lutgenau
2015/0114943 A1    4/2015  Oberndorfer
2015/0375332 A1*  12/2015  Dillon .................... B23K 9/291
                                                    219/137 R

OTHER PUBLICATIONS

Abirob Cyclone(r) Endless Rotation Mig Torch Brouchure. pp. 1-8. Abicor Binzel USA, Inc. Frederick, Maryland.

* cited by examiner

METHOD OF ROTATING A WELDING TORCH DURING OPERATION

RELATED APPLICATIONS

This application claims the benefit of the filing date of U.S. Utility patent application Ser. No. 15/813,932, filed on Nov. 15, 2017, entitled "Reduced Friction Rotating Coupler Assembly and quick disconnect for use with Welding devises" by Juan Solis, the entirety of which is incorporated herein by reference.

BACKGROUND OF THE INVENTION

A. Field of Invention

The present invention is in the technical field of Welding devices. More particularly, the present invention is in the technical field of gas metal arc welding (GMAW) and metal inert gas (MIG) welding torches.

B. Description of Related Art

Prior art welding torches used in welding metallic materials together, such as MIG welding torches, have generally utilized a fixed or rotating conductor tube or goose neck mechanically and electrically connected to a unicable which generally supplies power, welding or shielding gas, and filler wire to the MIG torch. The unicable generally comprises a core tube for passage of the filler wire, welding/shielding gas, and liner, copper cabling for conducting the electrical current to the torch, and shielded lead wires for controlling the operation of the torch. The unicable is permanently attached to an end of a typical MIG torch, generally via a crimp or other permanent mechanical attachment. In MIG torches with a fixed goose neck the unicable will undergo bending and flexing as the MIG torch is moved and rotated. This bending and flexing cyclically stresses the unicable and after a finite number of cycles the unicable will fail. In human operated torches the time needed to reach the cycle life of an unicable is variable depending on the method of use by the operator. In robot operated torches the life a welding torch generally tends to be longer than a human operated torch due to the reduced range of movement experienced by the unicable in typical robotic welding applications. The service life of a MIG unicalble used in a robotic application can be extended by the use of a MIG torch that is rotatable versus a fixed torch, resulting in increased productivity due to the increase in the amount of time before the unicable requires replacement or service and the reduced movement required to perform certain operations. Rotating torches that can rotate a full 360 degrees or any amount less than 360 degrees, fully rotatable welding torches are more desirable than rotatable welding torches that are limited to ~270 degrees or less. Prior attempts at a rotating welding torch have used various methods to accomplish rotation. Such as U.S. Pat. No. 7,665,996 by Jaeger et al. (hereinafter Jaeger) which uses a rotating power connector on the goose neck mating end of the unicable.

As seen in FIG. 2 of Jaeger, this design uses a connector pin 34 and rotating stud 40 that are in direct contact with each other inside the rotating power connector assembly. The rotating stud 40 has a bearing 62 at approximately half the axial length of the rotating stud 40 to facilitate rotation. The Jaeger design relies on multiple current paths to ensure an electrical connection between the unicable and the goose neck and uses a secondary contact ring 52 to accomplish this task. The secondary contact ring 52 of Jaeger is designed to act as a wedge between the rotating stud 40 and the inner housing 50. The electrical contact faces of the rotating stud 40 and connector pin 34 are horizontal faces that are pressed against one another by a spring (biasing member 58) that also pushes or wedges the contact ring 52 between the tapered surface 60 of the inner housing 50 and contact portions 54 of the contact ring 52. This wedging produces friction between the contact ring 52 and rotating stud 40 that increases the amount of torque required to turn the connector pin 34 about the rotating stud 40. As result, the amount of breakaway torque required to spin the connector pin 34 is ~0.32624 N-m (2.89 inch-lbs), which is a significant amount if attempted by hand. The frictional force between the connector pin 34 and rotating stud 40 causes mechanical wear on the contact surfaces of the Jaeger invention which will eventually lead to the failure of the welding torch in accordance with Jaeger. As can be seen in FIG. 4 of Jaeger, the invention of Jaeger is permanently attached to the unicable 18 via an unlabeled mechanical crimp seen below the location of the label "18" near the proximal end of the figure.

Another side effect of the significant breakaway torque required by Jaeger and other prior art rotatable welding torches is the torsion and or minor rotation of the unicable at the mechanical attachment to the prior art torch. This results in visually observable movement, of the unicable relative to the robot arm, at the mechanical attachment to the prior art welding torch. The movement is not as significant as the movement that occurs in fixed head welding torches but does result in reduced service life of the unicable.

Typical power supplies for MIG welding torches can output between 0 and 800 amps. The unicable and all portions of the MIG welding torch that are part of the electrical circuit between the power supply and MIG welding torch are required to withstand the maximum current output of the power supply being used for any given application.

SUMMARY OF THE INVENTION

The present invention provides a rotating power connector that reduces the amount of torque required to spin the welding torch assembly about a central axis. The present invention reduces the amount of torque required to spin the rotating assembly by reducing the amount of axial force required to keep the rotating and contact elements of the assembly in electrical communication. The reduction in axial force is partially accomplished by using mating conical geometries (interlocking convex and concave surfaces) that use the cone angle of the mating surfaces to reduce the axial component of the contact force need to maintain electrical communication between the surfaces when compared to rotating connectors used in previous designs of rotating MIG Torches. Additionally the conical shape of the contact surfaces allows for increased surface area versus designs that use horizontal faces that are in contact in the axial direction, such as the invention of Jaeger. Additionally, the present invention allows for embodiments that can be quickly disconnected from the unicable while allowing for rotation of the goose neck and wear in the axial direction by the internal components of the rotating coupler assembly.

BRIEF DESCRIPTION OF THE DRAWINGS

Figures are not drawn to scale. The figures depict one or more embodiment of the present invention, additional embodiments are not illustrated.

DETAILED DESCRIPTION OF THE INVENTION

Figure 1:
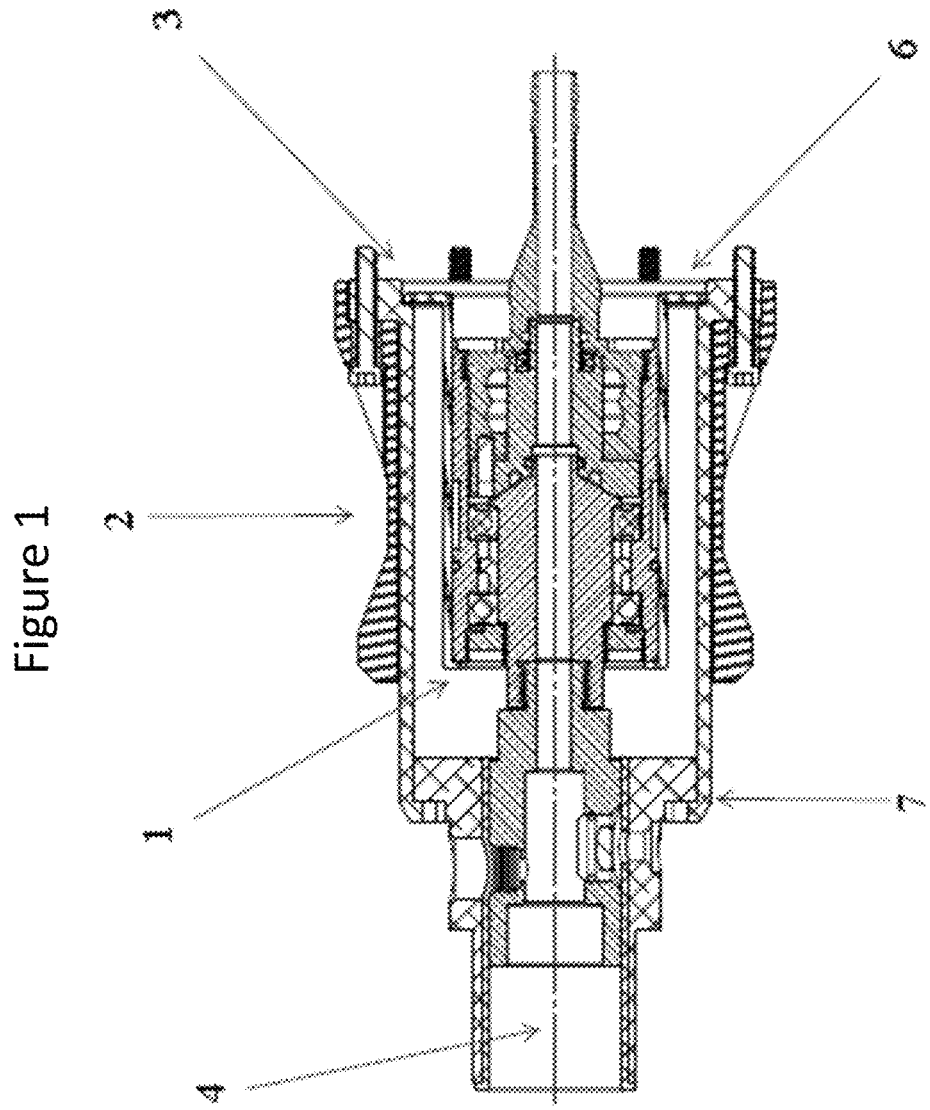
FIG. 1 is a cross section of a welding torch assembly including an embodiment of the present invention.

Referring now to the drawings, wherein like reference numerals designate identical or corresponding parts throughout the several views, embodiments of the invention shown. The present invention is a reduced friction rotating coupler assembly with or without quick disconnect from the unicable for use with welding torches.

A cross sectional view of an embodiment of the present invention can be seen in FIG. 1. The reduced friction rotating coupler assembly (hereinafter RCA) 1 is located inside the welding torch assembly 2. The welding torch assembly 2 is mechanically attached to a robotic arm (not shown) via a flanged interface 3 located at the proximal end of the welding torch assembly 2. The welding torch assembly 2 is rotated about a central axis 4 as the flanged interface 3 is rotated by the movement of the robotic arm (not shown).

Figure 2:
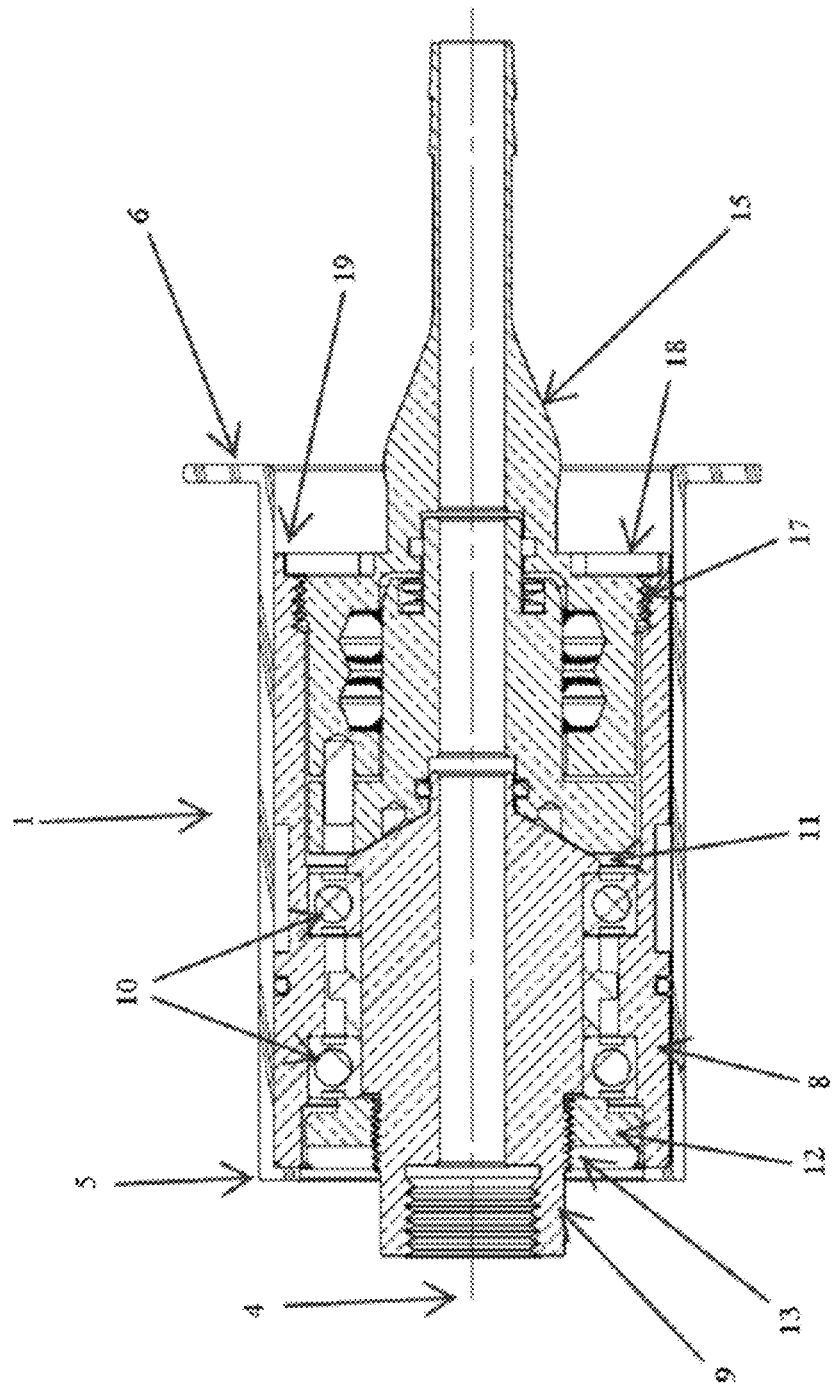
FIG. 2 is a partial cross section detailing an embodiment of the present invention.

As seen in FIGS. 1 and 2, the RCA 1 has an outer housing 5 that serves as an insulator and a means for positioning the RCA 1 via a interface between the proximal end of the RCA 1 and the proximal end of the main body 7 of the welding torch assembly 2. A flange 6, located at the proximal end of the substantially cylindrical outer housing 5 of the RCA 1 is positioned in a stepped recess located at the proximal end of the main body 7 of the welding torch assembly 2. The flange 6 limits the radial movement of the proximal end of the RCA 1 inside the welding torch assembly 2. The flange 6 is in mechanical communication with the main body 7 of the welding torch assembly 2 but not electrical communication due to the insulating properties of the outer housing 5 of the RCA 1.

As seen in FIG. 2, the substantially cylindrical inner housing 8 is positioned within the outer housing 5 of the RCA 1 and extends for substantially the entire length of the RCA 1. A substantially cylindrical rotating member 9 is positioned at the distal end of the RCA 1 along the central axis 4 within the inner housing 8 of the RCA 1. The rotating member 9 is mechanically supported by at least one bearing 10. The bearing(s) 10 are in mechanical communication with the inner housing 8 and rotating member 9. The bearing(s) 10 are centered within the inner housing 8 and in turn center the rotating member 9 along the central axis 4. The material selection for the bearing(s) 10 does not require a material that is electrically conductive, materials with low electrical conductivity or insulating qualities (i.e. ceramic bearings) are preferable as electrical conduction through the bearing(s) 10 would reduce the life of bearing(s) 10 by drying out the lubricant sealed within.

As seen in FIG. 2, the rotating member 9 has a first locking feature at the proximal end of the rotating member 9, in this embodiment a flange 11, is in mechanical communication with a bearing 10 thereby limiting the axial movement along the central axis 4 of the rotating member 9 within the RCA 1. The rotating member 9 has a second locking feature at the distal end of the rotating member 9, in this embodiment a threaded lock ring 12. Threads 13 on the outer diameter of the distal end of the rotating member 9 are in mechanical communication with the threaded lock ring 12. When installed the lock ring 12 and the flange 11 limit the axial movement of the rotating member 9 within the RCA 1.

Figure 3:
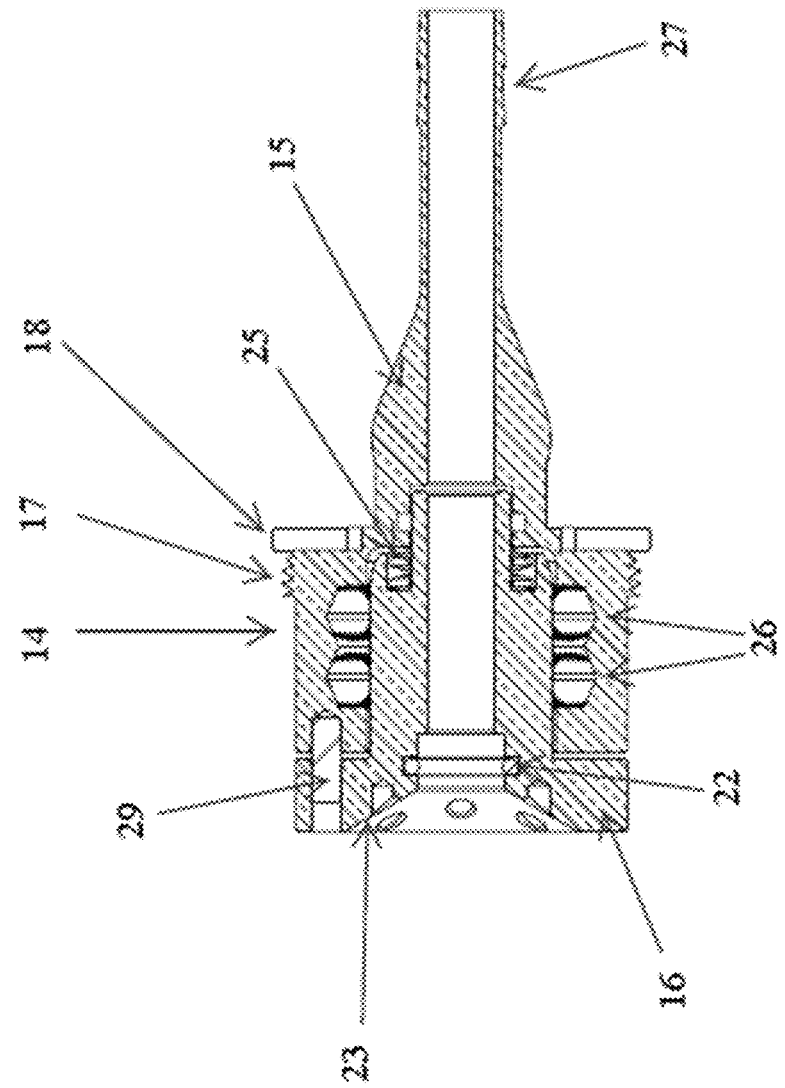
FIG. 3 is a cross section of the constant pressure apparatus used by one embodiment of the present invention.
Figure 4:
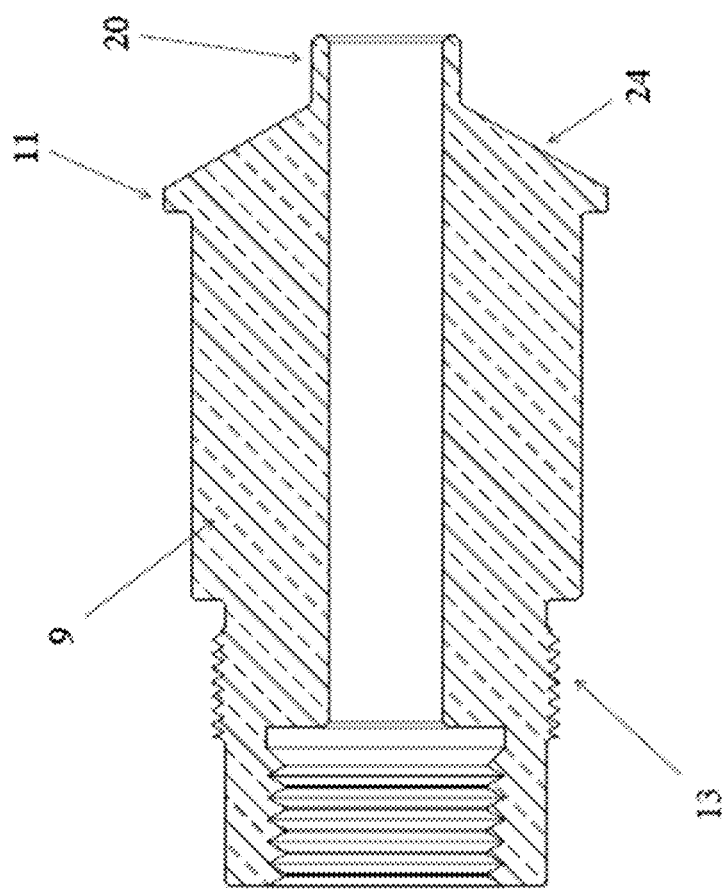
FIG. 4 is a cross section of a rotating member used by one embodiment of the present invention.

As seen in FIG. 1-2, a constant pressure apparatus 14 is installed in the proximal end of the RCA 1 within the inner housing 8 of the RCA 1. As seen in FIG. 3, the constant pressure apparatus 14 comprises a receiving member 15 and a sliding member 16. The receiving member 15 has threads 17 at the distal end of the receiving member 15 which engage the threaded proximal end of the inner housing 8. A flange 18 of the receiving member 15 engages the step 19 at the proximal end of the inner housing 8 of the RCA 1, thereby setting the axial location the receiving member 15 along the central axis 4. As seen in FIG. 1-2, the inner diameter of sliding member 16 of the constant pressure apparatus 14 is in mechanical communication with the outer diameter of centering feature 20 of the rotating member 9 via a centering feature 22, in this embodiment an o-ring, of the sliding member 16 located at the distal end of the sliding member 16. The centering feature 22, in this embodiment an o-ring, centers the proximal end of the rotating member 9 along the central axis 4 as well as acting as a pneumatic seal. The centering feature 20 of the rotating member 9 is designed to allow for the sliding member 16 to move towards to the distal end of the RCA 1 as the concave contact surface 23 of the sliding member 16 wears into convex contact surface 24 of the rotating member 9.

FIG. 1 shows the rotating member 9 and the sliding member 16 are in electrical communication via a radial contact interface. In this embodiment radial contact interface comprises a concave contact surface 23 on the distal end of the sliding member 16 and a convex contact surface 24 on the proximal end of the rotating member 9 of the RCA 1. The concave contact surface 23 and convex contact surface 24 are in mechanical and electrical communication with each other due to the force exerted by an axial force member 25. In this embodiment the axial force member 25 is located in a recess in the proximal end of the sliding member 16. When the receiving member 15 is seated in the step 19 located at the proximal end of the inner housing 8 of the RCA 1 the axial force member 25, in this embodiment a spring, exerts an axial force against the receiving member 15 and sliding member 16; as the receiving member's 15 axial location is fixed by the flange 18 and step 19 of the inner housing 8, the concave contact surface 23 of the sliding member 16 is pressed against the convex contact surface 24 of the rotating member 9 thereby creating an electrical conduction path between the sliding member 16 and the rotating member 9. The sliding member 16 and receiving member 15 are designed to prevent rotation by the sliding member 16, in this embodiment an anti rotation pin 29 is pressed into the receiving member 15 and slip fit into the sliding member 16.

In some embodiments, an electrically conductive lubricant can be used to reduce friction between the contact surfaces of the sliding member 16 and rotating member 9, including but not limited to oil or grease containing copper, silver, nickel, or other metal based or impregnated lubricant. The sliding member 16, rotating member 9 and axial force member 25 are designed to allow between 1-5 mm of wear between the contact surfaces before electrical conduction between the sliding member 16 and rotating member 9 can no longer be maintained. The axial force member 25, in this embodiment a spring, exerts an axial force between 44.48-111.20 N (10-25 lbf) on the sliding member 16 and the receiving member 15. In one embodiment the initial spring load is 20 lbs, at this spring load the breakaway torque of the RCA 1 is measured to be ~0.202 N-m (1.79 ft-lbs). The low breakaway torque required by the RCA 1 has the added benefit of allowing a welding torch in accordance with the present invention to rotate about a central axis 4 with zero to virtually no torsion or rotation translated to the unicable. While in operation, the unicable in a welding torch in accordance with the present invention will not be subjected to torsion loading or rotate as a result of rotation of the welding torch about the central axis 4.

The inner diameter of the receiving member 15 is designed to accommodate at least one compressible electric contact member, in this embodiment a canted coil spring. The compressible contact member(s) (not shown) are seated in radial grooves 26 in the receiving member 15 and conduct electricity between the sliding member 16 and the receiving member 15 while allowing the sliding member 16 to move in the axial direction, along the central axis 4, while maintaining electrical conduction between the sliding member 16 and the receiving member 15.

The rotating member 9, sliding member 16, compressible contact member(s) (not shown), and receiving member 15 are manufactured out of electrically conductive materials (including but not limited to copper, brass, silver, and gold) and are in electrical communication. The inner housing 8 and lock ring 12 can be manufactured from the same material as the receiving member 15, sliding member 16, and or the rotating member 9 but do not need to be manufactured from electrically conductive materials as no secondary conduction path is needed by the present invention.

In one embodiment of the present invention the proximal end of the receiving member 15 is configured as a hose barb 27 that extends beyond the proximal end of the RCA 1 in the proximal direction about the central axis 4 and extends beyond the proximal end of the welding torch assembly 2 in the proximal direction about the central axis 4. The hose barb 27 is mechanically connected to the core tube of an unicable (not shown). The hose barb 27 is crimped to the copper cabling of the unicable (not shown) creating a permanent mechanical and electrical connection between the receiving member 15 and the unicable.

Figure 5:
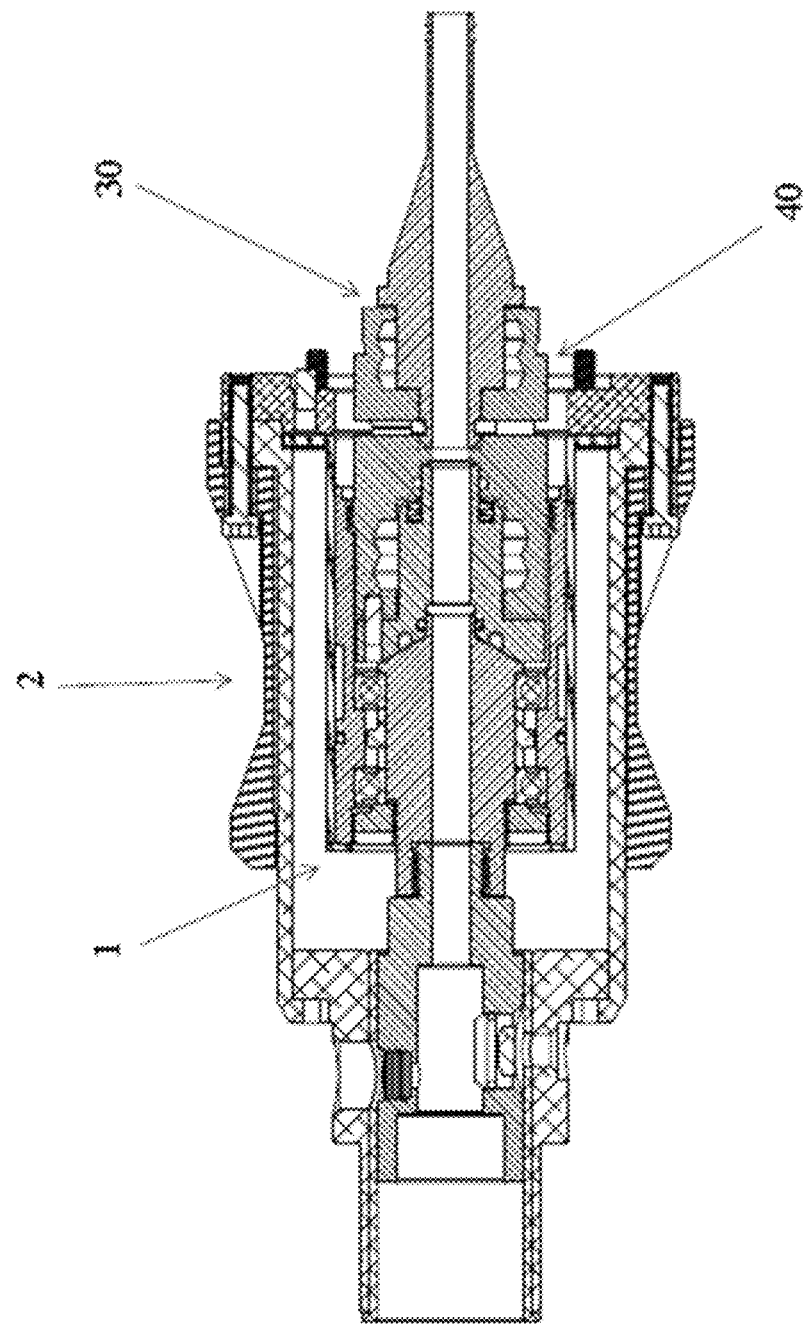
FIG. 5 is a cross section of a second embodiment of the present invention that includes a quick disconnect from the unicable.
Figure 6B:
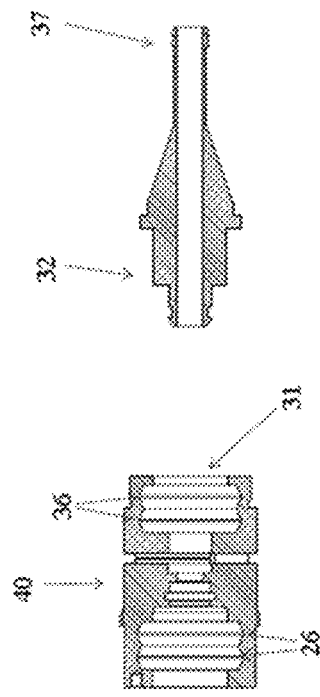
FIGS. 6a and 6b are cross sections of the receiving member and the male and female connections of the quick disconnect used by the second embodiment of the present invention.
Figure 6A:
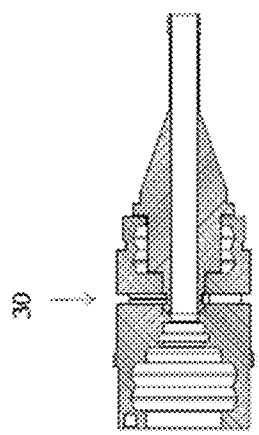

FIG. 5 shows another embodiment of the present invention. In this embodiment the proximal end of this embodiment's receiving member 40 is configured as quick disconnect 30. As seen in FIGS. 6*a* and 6*b*, the quick disconnect 30 comprises a female connection 31 and male connection 32. The proximal end of the male connection 32 is a hose barb 37 that is in mechanical and electrical communication with a unicable (not shown). The female connection 31 is designed to accommodate at least one compressible electric contact member (not shown), in this embodiment a canted coil spring. The female connection 31 has at least one radial groove 36 to accommodate a compressible electric contact member (not shown). The compressible electric contact member (not shown) conducts electricity between the female connection 31 and the male connection 32 without the use of a permanent mechanical connection, such as a crimp. The quick disconnect 30 functions in a similar fashion as the radial groove(s) 26 and compressible electric contact member(s) function as a slidable assembly in the RCA 1; the quick disconnect 30 allows for the male connection 32 to be inserted into the female connection 31 while allowing for the conduction of 0-800 amps of electric current. This embodiment of the present invention has the advantage of being capable of disconnection from the unicable in a quick and repeatable fashion. As a result, this embodiment also has the advantage of allowing the entire welding torch assembly 2 to be removed from the robotic arm (not shown) without having to remove the unicable (not shown) from robotic arm (not shown). A significant saving in time and labor are achieved by this embodiment because welding torch assembly 2 can be removed for maintenance without removal of the unicable, liner and filler material required for normal operation of a welding torch.

The female connection 31, male connection 32, and compressible contact member(s) are manufactured out of electrically conductive materials (including but not limited to copper, brass, silver, and gold) and are in electrical communication with each other and the RCA 1.

The quick disconnect 30 can include an anti-rotation feature, such as an anti-rotation pin 29 seen in the RCA 1. The quick disconnect 30 can include a releasable locking feature to prevent the removal of the male connection 32, in the axial direction along the central axis 4, after it has been inserted into the female connection 31 without the locking feature being released.

The invention claimed is:

1. A method of rotating an electric welding torch, the method comprising:
    providing a coupler assembly comprising: a central axis that extends from a distal to a proximal end of the coupler assembly;
    a rotating contact member axially disposed within they coupler assembly;
    a sliding contact member axially disposed within the coupler assembly;
    a receiving member axially disposed within the coupler assembly;
    at least one radial contact member positioned between the sliding contact member and the receiving member to achieve mechanical and electrical communication between the sliding contact member and the receiving member;
    wherein the rotating contact member has a contact surface that is in mechanical and electrical communication with a contact surface on the sliding contact member.

2. The method of claim 1, wherein said rotating contact member, sliding contact member and receiving member are axially installed within an inner housing of the coupler assembly.

3. The method of claim 2, wherein said inner housing is axially installed within an outer housing of the coupler assembly.

4. The method of claim 1, wherein said sliding contact member and rotating contact member are kept in mechanical and electrical communication via an axial member which allows for at least 5 mm of wear between the contact surfaces of the sliding contact member and rotating contact member.

5. The method of claim 3, wherein said axial member is a spring which exerts between 44.48-111.20N (10-25lbf) of force in the axial direction when the coupler is assembled.

6. The method of claim 1, wherein the rotating contact member of the coupler assembly can rotate continuously and can initiate rotation about the central axis by overcoming an initial frictional resistance to axial rotation generated by the contact surfaces of the rotating contact member and sliding contact member with a breakaway torque of ~0.202N-m (1.79 ft-lbs) or less.

7. The method of claim 1, wherein said sliding contact member is able to move in the axial direction but is mechanically prevented from rotating about the central axis.

8. The method of claim 1, wherein said receiving member is mechanically prevented from rotating about the central axis or moving in the axial direction along the central axis.

9. The method of claim 1, wherein said sliding contact member is axially disposed within the receiving member.

10. The method of claim 1, wherein said at least one radial contact member is a canted coil spring capable of conducting at least 800 amps of current.

11. The method of claim 1, wherein said at least one radial contact member is compressible and capable of conducting at least 800 amps of current.

12. The method of claim 1, wherein the contact surfaces of the sliding contact member and rotating contact member are mating conical surfaces.

13. The method of claim 1, wherein the contact surface of the sliding contact member is concave and the contact surface of the rotating contact member is convex.

14. The method claim 1 further comprising:
an electrical and mechanical joint at the proximal end of the coupler assembly;
wherein the coupler assembly can be independently separated from a supply cable via a detachable connection.

15. The method of claim 14, wherein the electrical and mechanical joint further comprises:
a supply cable sliding member and a supply cable receiving member which are in electrical and mechanical communication via a radial contact member;
wherein the radial contact member allows for quick and repeatable detachment and assembly between the supply cable and coupler assembly.

16. The method of claim 14, wherein said electrical and mechanical joint is capable of conducting 0-800 amps of electrical current.

17. The method of claim 1, wherein a pneumatic seal is disposed between the rotating contact member and sliding contact member.

* * * * *